United States Patent [19]

Wang et al.

[11] Patent Number: 4,540,143

[45] Date of Patent: Sep. 10, 1985

[54] NACELLE/WING ASSEMBLY WITH WAKE CONTROL DEVICE

[75] Inventors: Timothy Wang; Thomas A. Zierten, both of Bellevue, Wash.

[73] Assignee: The Boeing Company, Seattle, Wash.

[21] Appl. No.: 520,826

[22] Filed: Aug. 4, 1983

[51] Int. Cl.³ .................. B64C 23/06; B64D 29/02
[52] U.S. Cl. ................................. 244/130; 244/199; 244/204
[58] Field of Search .............. 244/199, 200, 130, 91, 244/34 A, 204

[56] References Cited

U.S. PATENT DOCUMENTS 3,065,929  11/1962  Holland, Jr. .................. 244/34 A
3,744,745  7/1973  Kerker et al. .................. 244/199
4,378,922  4/1983  Pierce .......................... 244/199

Primary Examiner—Galen L. Barefoot
Attorney, Agent, or Firm—Hughes, Barnard & Cassidy

[57] ABSTRACT

In a wing and nacelle combination, where the nacelle is positioned below and forwardly of the wing leading edge, a wake control device to control a turbulent wake which is formed at the upper forward lip portion of the nacelle. This wake control device comprises a forward vortex generating portion to create a vortex which travels over the leading edge of the wing, and also a fence located at the middle third of the nacelle to control boundary layer air and thus properly locate the wake control vortex.

19 Claims, 16 Drawing Figures

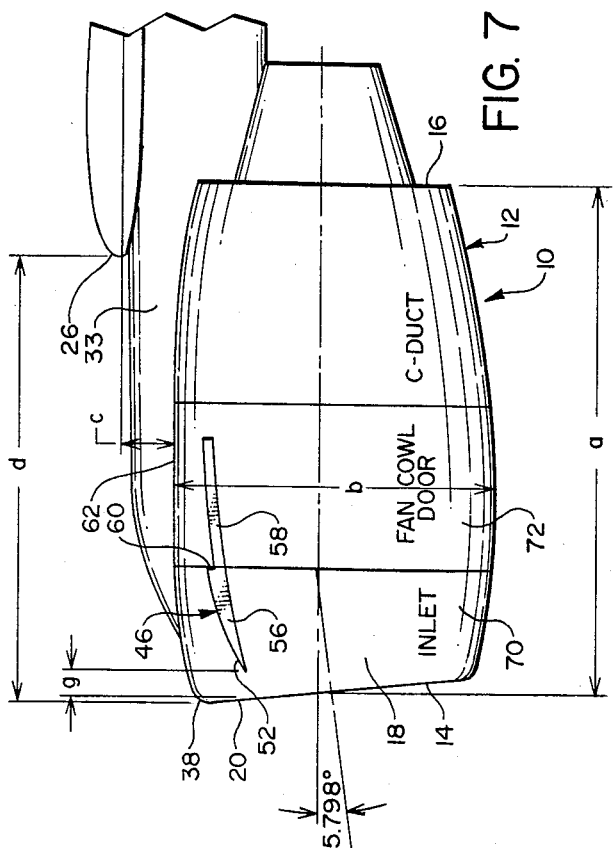
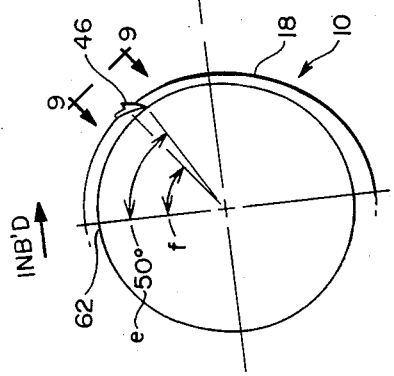
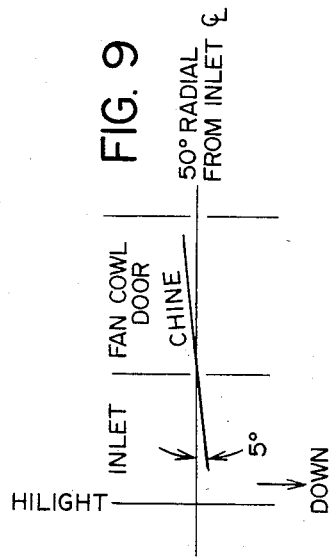

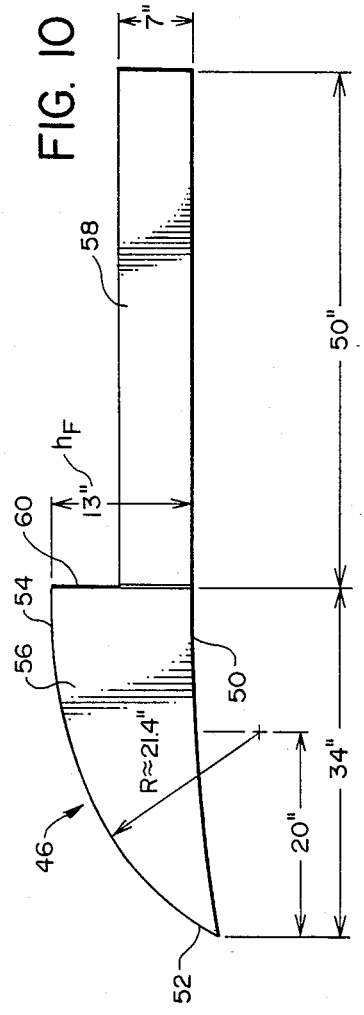
FIG. 10
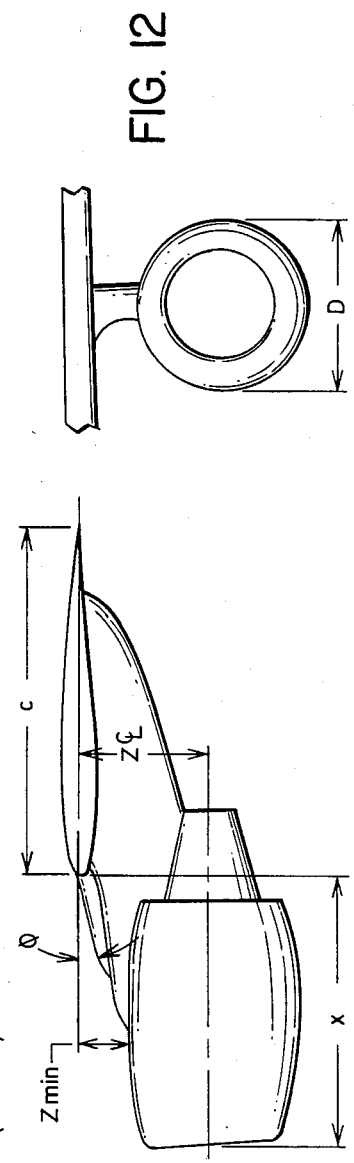
FIG. 12
FIG. 11

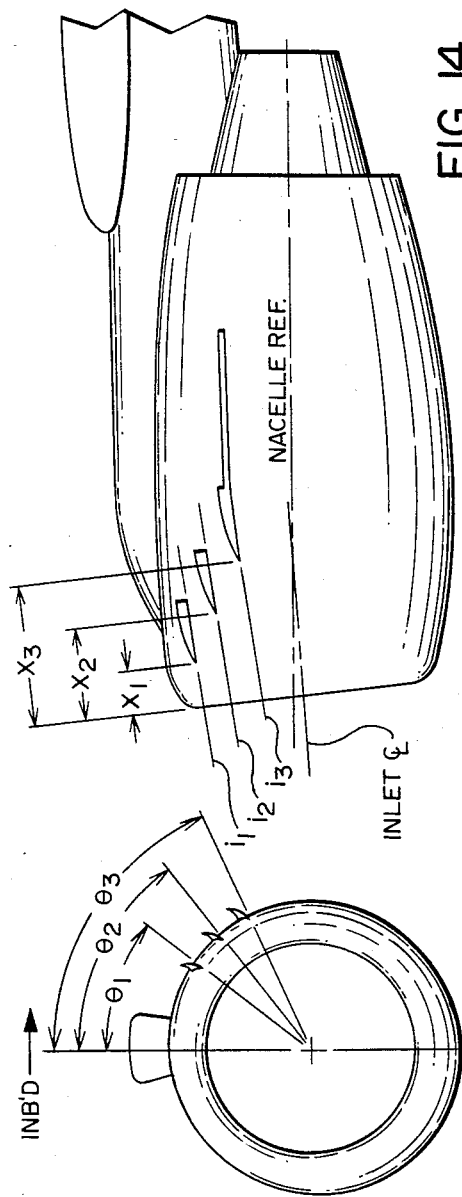
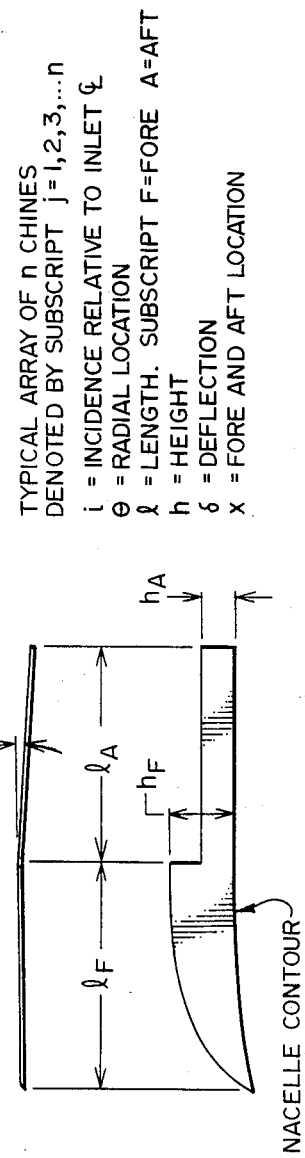
FIG. 14
FIG. 15
FIG. 16
TYPICAL ARRAY OF n CHINES DENOTED BY SUBSCRIPT j=1,2,3,...n
i = INCIDENCE RELATIVE TO INLET ℄
θ = RADIAL LOCATION
ℓ = LENGTH. SUBSCRIPT F=FORE A=AFT
h = HEIGHT
δ = DEFLECTION
x = FORE AND AFT LOCATION

NACELLE/WING ASSEMBLY WITH WAKE CONTROL DEVICE

BACKGROUND OF THE INVENTION

1. Technical Field

The present invention relates to a nacelle and wing assembly of an aircraft, and more particularly to such an assembly with means to improve aeordynamic performance when operating at high angles of attack where there is interaction of nacelle wake and wing boundary layer at near stall condition.

2. Background Art

It is quite common in present day aircraft designs to place the engine nacelle below the wing with the inlet of the nacelle being positioned forwardly of the leading edge of the wing. This nacelle/wing assembly is normally designed so that in cruise configuration the air flow around the nacelle causes relatively little disturbance to the airflow adjacent the wing. However, landing and/or take off performance is tied to the stall speeds at various flaps down configurations. The higher the stalling angle of attack, the lower the stall speed and hence lower takeoff and landing speeds, resulting in shorter field length. At these high angles of attack, corresponding to stalling of high lift configurations, the nacelle sees an even higher angle due to the wing lift induced upwash. In many wing nacelle assembly configurations, the effect is an undesirable interaction of the nacelle and wing flow fields which reduces the lift which might otherwise be achieved.

One prior art approach to identify the nature of the problem and provide an appropriate solution is disclosed in U.S. Pat. No. 3,744,745, Kerker et al, where there is shown a nacelle/wing assembly, with a swept back wing and an engine nacelle mounted downwardly and forwardly of the wing leading edge. Mounted on the forward upper surface portion of the engine nacelle just behind the nacelle inlet are a pair of lift vanes. The text of the patent indicates that these vanes produce a downwash field between trailing vortices in the vicinity of the wing leading edge. It is further alleged that this field in turn reduces the high suction pressure peaks on the wing leading edge aft of the engine nacelle, tending, in turn, to delay the onset of airflow separation at the wing trailing edge forward of the flap. It is further stated that this delay in airflow separation permits the wing to generate more lift.

While it is generally known that vanes can be used to improve performance of nacelle/wing assemblies in a high lift mode of operation, these same vanes have an undesirable aspect in that for cruise mode of operation, they will normally tend to increase drag. Therefore, in general, it is desirable to size these vanes to alleviate the drag problem for cruise configuration, and yet to arrange the configuration and location of such devices to optimize their desirable effects in improving performance during the high lift/high angle of attack mode of operation.

However, the task of designing devices to modify the airflow about a nacelle wing assembly is enormously complex. In the design of an aircraft, generally the overall configuration of the wing and nacelle are at a certain stage of the design fixed within certain limits. If an aerodynamicist had the luxury of unlimited time to test a particular nacelle wing assembly in the wind tunnel, with unlimited budget, then he could embark on an extended experimental program of placing flow modifying devices of various configurations at various locations and eventually, by a lengthy process of trial and error, the overall design could be optimized. However, as a practical matter, where the entire airplane must be designed within certain budget limitations, such endless experimentation is not possible. Therefore, it becomes incumbent upon the aerodynamicist to analyze the performance and flow patterns of a given nacelle/wing assembly to determine which experimental avenues might be examined more advantageously to optimize performance. To conduct this analysis successfully with reasonable consistency requires not only an understanding of the aerodynamic phenomena which exists for a particular nacelle/wing assembly, but also what sort of flow modifying means might be employed successfully to be effective in resolving the problems associated with that particular phenomena.

In view of the foregoing, it is an object of the present invention to provide a nacelle/wing assembly with appropriate wake control means, a method of designing and building such an assembly, and a method of utilizing such an assembly, where, with the wing nacelle assembly in a high lift, high angle of attack mode of operation, certain aerodynamic phenomena exist which are alleviated by effective use of certain wake control means.

SUMMARY OF THE INVENTION

The present invention is adapted to be used in a nacelle and wing combination, where the wing is swept and has a leading edge, a trailing edge, a upper surface and a lower surface. The nacelle is mounted below and forwardly of the leading edge of the wing, and the nacelle has an outside surface and a forward portion extending forwardly of the wing leading edge. The nacelle has a forward inlet lip with an upper lip portion. Also, the forward portion of the nacelle comprises a front third portion, a middle third portion, and a rear third portion. The wing has a first forward swept portion extending laterally and forwardly from the nacelle and a second rear swept portion extending laterally and readwardly from the nacelle. The nacelle has first and second side portions adjacent said first and second wing portions, respectively.

The wing and nacelle combination is characterized in that in a wing and nacelle along configuration, with the wing in a high lift configuration and in a high lift/high angle of attack mode of operation, flow separates from the upper lip portion to form a highly turbulent wake which passes over the wing leading edge. The wake has first and second side portions at the first and second wing portions, respectively. The wake first side edge portions expands laterally and rearwardly across the first forwardly swept wing portion so as to reduce lift.

The improvement is a wake control means located on the nacelle surface adjacent the first edge portion of the wake. The wake control means comprises a forward vortex generating portion extending outwardly from the nacelle surface and positioned rearwardly of the inlet lip of the nacelle. There is a second fence portion positioned rearwardly of the vortex generating portion and extending lengthwise in the middle third portion of the nacelle. The forward vortex generating portion functions primarily to initially generate a vortex which travels rearwardly and over the wing leading edge. The fence portion controls boundary layer air which flows upwardly and rearwardly along said nacelle first side surface portion so as to direct some of the boundary layer air away from the wing leading edge portion which is proximate to an upper part of the nacelle first side surface portion, thus energizing other portions of the boundary layer air. The vortex becomes properly positioned adjacent the first side edge portion of the wake to limit expansion of the first side edge portion of the wake over the wing.

In the preferred configuration, the wake control means has an elongate configuration with a lengthwise axis generally aligned with a lengthwise axis of the nacelle and aerodynamically contoured to limit drag for cruise mode of operation. In one configuration, the vortex generating portion and the fence portion are aligned with one another and provide a substantially aerodynamic continuous wake control means. Further, in a specific improved configuration, the vortex generating portion has a height dimension from a center axis of the nacelle greater than a height dimension of the fence portion.

In another configuration, the wake control means comprises a plurality of separate wake control members positioned at spaced lengthwise locations along the nacelle surface. Also, in the preferred embodiment shown herein, the vortex forming portion is located in the front third portion of the nacelle. In a specific configuration, the nacelle has a cowl door located at the middle third portion, and the fence portion is mounted to said door. The vortex forming portion in this configuration has a height greater than the fence portion.

In the method of the present invention, a vortex is formed on the nacelle surface adjacent the first edge portion of the wake, and a fence is provided in the middle third of the nacelle rearwardly of the vortex generating location.

Also, within the scope of the present invention is a method of designing and building the nacelle and wing combination, where the nacelle and wing have the characteristics noted previously herein. This comprises determining whether a wake condition exists, and then determining the location of the first side portion of the wake. A vortex generating means is located rearwardly of the lip adjacent to the first side edge portion to create a vortex as described above. Then a fence is located rearwardly in the vortex generating portion in the middle third portion of the nacelle.

Other features of the present invention will become apparent from the following detailed description.

DESCRIPTION OF THE DRAWINGS

FIG. 7 is a side elevational view of the assembly of FIG. 4, and showing the wake control device more clearly;

FIG. 8 is a front elevational view of the assembly of FIG. 7;

FIG. 9 is a schematic view taken at location 9—9 of FIG. 8, illustrating angular alignment of the wake control device relative to the longitudinal centerline of the nacelle;

FIG. 10 is a side elevational view illustrating the wake control device by itself and showing its preferred dimensions for this particular nacelle wing assembly;

FIG. 11 is a side elevational view of a nacelle and wing assembly, illustrating certain critical relationships used in evaluating the desirability of utilizing the present invention;

FIG. 12 is a front elevational view of the assembly of FIG. 11;

FIG. 14 is a side elevational view illustrating somewhat schematically different design approaches which might be taken within the broader scope of the present invention;

FIG. 15 is a front elevational view of the assembly of FIG. 14; and

FIG. 16 is a side elevational view of the wake control device, showing the geometric parameters.

DESCRIPTION OF THE PREFERRED EMBODIMENTS

The implementation of the teachings of the present invention is dependent upon first an understanding of the flow phenomena associated with certain nacelle/wing configurations, and secondly an understanding of how certain flow modifying means can be used with such assemblies to alleviate the problems associated therewith.

Figure 1:
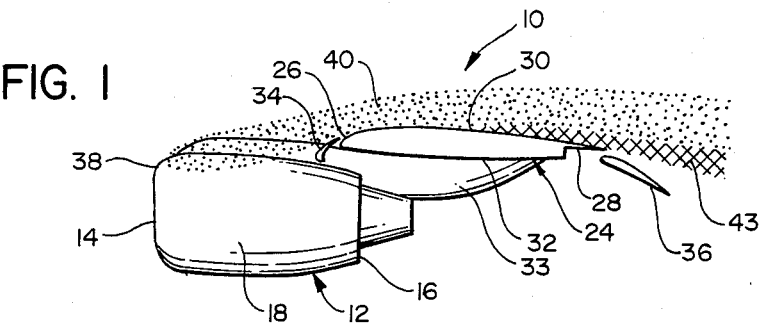
FIG. 1 is a side elevational view of a nacelle and wing assembly in a high lift/high angle of attack mode of operation, with a turbulent wake being formed at the upper inlet lip.
Figure 2:
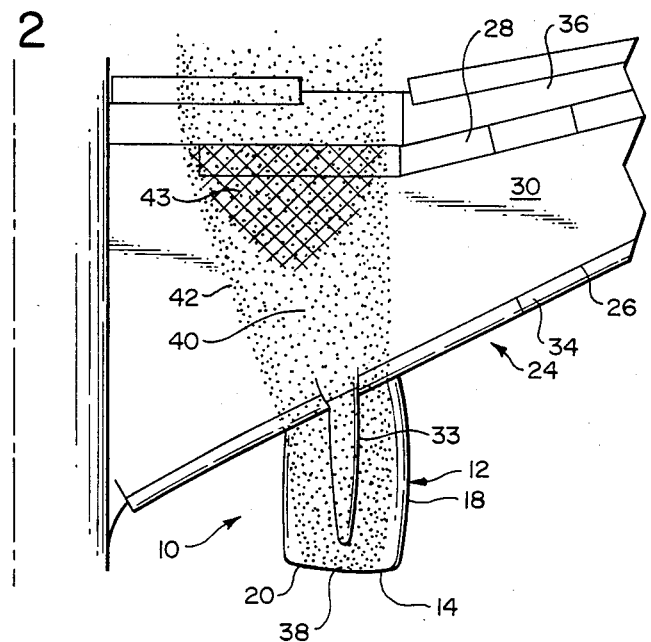
FIG. 2 is a top plan view of the assembly of FIG. 1, showing the manner in which the wake spreads in an inboard direction across the wing.
Figure 3:
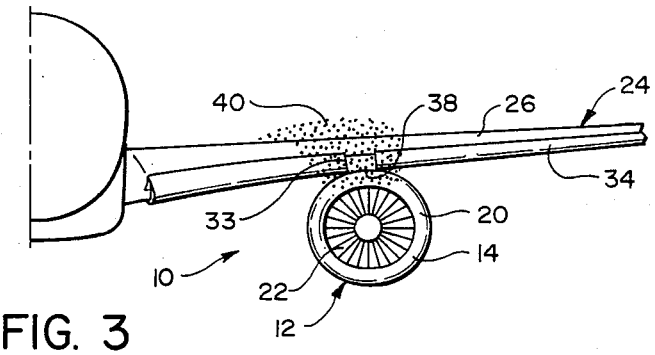
FIG. 3 is a front elevational view of the assembly of FIGS. 2 and 3, showing the wake travelling over the leading edge of the wing.

In FIGS. 1, 2 and 3, there is shown a nacelle/wing assembly 10 which is typical for many modern day jet transport planes. The nacelle 12 is or may be of conventional design, and it comprises an inlet end 14, an exhaust end 16 and a side wall providing an exterior circumferential side surface 18 extending from the inlet 14 to the exhaust end 16. At the inlet end 14, there is a circumferential inlet lip 20 which defines the inlet itself, designated 22.

The wing 24 has a leading edge 26, a trailing edge 28, an upper surface 30 and a lower surface 32. As is common with many modern day jet transports, the leading edge has a rearward and outboard sweep of approximately five degrees to sixty degrees from an axis transverse to the longitudinal axis of the aircraft. The nacelle 12 is mounted by a pylon 33 to the lower side of the wing 24, in a manner that the major part of the nacelle 12 is forward of the wing leading edge 26. The wing 24 has leading edge devices 34 and trailing edge devices 36 which have a stowed configuration for cruise mode, but which are extended for a high lift mode of operation such as during takeoff and landing. Such leading and trailing edge devices 34 and 36 are illustrated somewhat schematically in FIGS. 1 through 3.

To understand the flow phenomena associated with the present invention, consideration is first given to the nacelle/wing assembly operating in cruise mode. The wing is at a very low angle of attack, and the flow around the nacelle 12 passes beneath the wing 24, with little or no tendency to degrade the performance of the wing 24. At stalling angle of attack where maximum lift is achieved, with the leading and trailing edge devices 34 and 36 deployed to their high lift positions, and with the wing 24 operating at a higher angle of attack, the nacelle 12 is exposed to a flow angularity equal to the geometric angle of attack plus the wing lift induced upwash. At such high angles of attack, the nacelle flow field can be approximated by a combination of a circular cylinder in cross flow (i.e. perpendicular to the axis of the cylinder), and ring wing at high angles. The nacelle inlet lip 20 behaves as part of the ring wing and is similar to a low aspect ratio lifting device. At moderate angles of attack, the wake of the nacelle 12 is dominated by a pair of fairly well defined vortices which pass over the wing leading edge 26. At moderate angles of attack, these vortices can actually improve the boundary layer over the wing 24 in its high lift configuration.

However, at high angles of attack, flow separates from the upper portion 38 of the inlet lip 20 and the vortices are replaced by a highly turbulent wake, indicated in FIGS. 1–3 by numeral 40. The path of the wake tends to follow the streamlines over the wing and is subject to the influence of the wing pressure field. Because of the wing sweep and presence of the nacelle strut, the wing leading edge suction always peaks just inboard of the pylon 32. This suction peak increases with the angle of attack so that at high angles, it pulls the nacelle wake 40 and boundary layer which has already been thickened with low energy air from the nacelle boundary layer. The resulting interaction of nacelle and wing flow induces flow separation and stalling of the inboard wing. This flow phenomena is best illustrated in FIG. 2, and it can be seen that the inboard edge portion 42 of the turbulent wake 40 slants in an expanding pattern in an inboard direction toward the trailing edge 28. The separated flow region is indicated generally by the more darkly shaded area 43 in FIG. 3. This reduces the lift which could otherwise be achieved.

It is to be understood that the flow phenomena described above with reference to FIGS. 1 through 3 do not exist for all nacelle/wing assemblies. For example, if the nacelle 12 is placed further below the wing 24, even though the turbulent wake is formed, it may pass beneath the wing so that there is no substantial degradation of performance. In other configurations, the upper portion 38 of the inlet lip 20 may be sufficiently far forward of the wing leading edge 24 and sufficiently high so that the turbulent wake passes far enough over the wing at high angles of attack so as to have little effect on flow adjacent the wing. Some configurations may not have leading edge high lift devices or have relatively ineffective ones, such that stalling angle of attack is lower than that at which the flow would separate from the nacelle inlet lip. Also, if the nacelle 12 is positioned a sufficient distance from the wing 24, even though the turbulent wake passes relatively closer to the wing upper surface 30, the effect on performance of the wing may not be sufficient to warrant the use of flow modifying devices. Thus, the teachings of the present invention are limited to those situations where the nacelle/wing configuration is such to generate the flow pattern such as those described above at high lift configuration and high angles of attack, where there is a substantial effect on performance in that operating mode.

Figure 4:
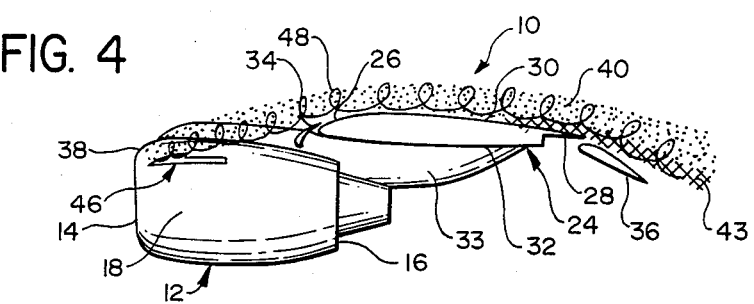
FIG. 4 is a side elevational view of an assembly such as that shown in FIG. 1, illustrating the wake control means of the present invention.
Figure 5:
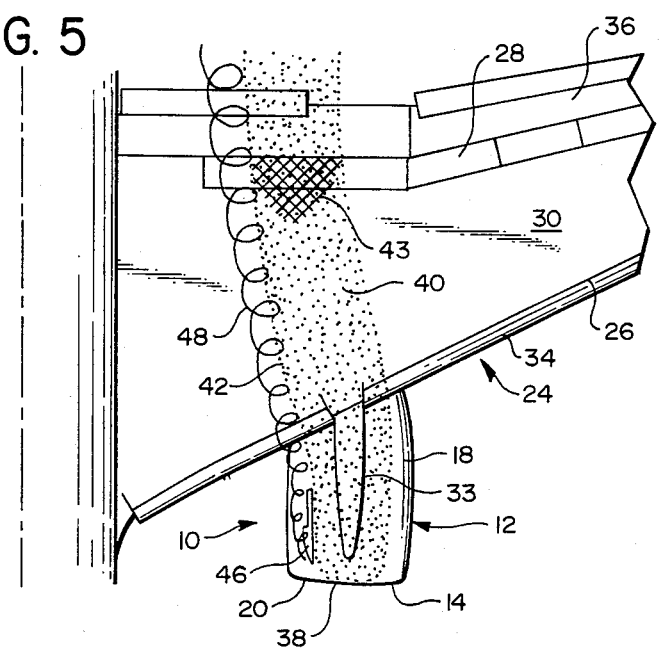
FIG. 5 is a top plan view of the assembly of FIG. 4, illustrating how the wake control device limits inboard expansion of the wake.
Figure 6:
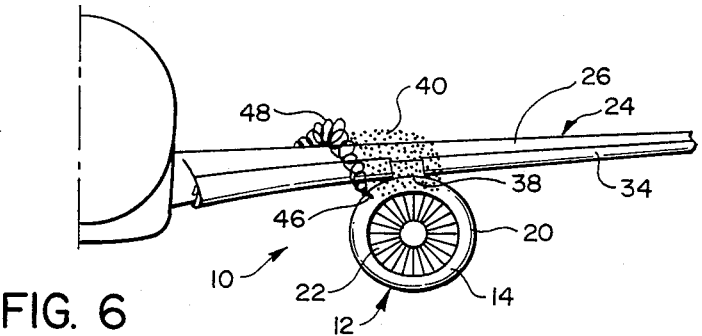
FIG. 6 is a front elevational view of the assembly of FIGS. 4 and 5, illustrating the mode of operation of the wake control device.

To describe the principle of the present invention, reference is now made to FIGS. 4, 5 and 6 where there is shown the nacelle/wing assembly such as that described above, having the flow pattern described above with reference to FIGS. 1 through 3. The present invention is based upon the finding that the turbulent wake problem indicated above can be substantially reduced by placing a nacelle wake control device 46 at the nacelle upper side surface that is adjacent the forward swept portion of the wing 24. (For ease of description, since the forward swept portion of the wing is the portion of the wing inboard of the nacelle 12, the location of the device 46 will be referred to as being at an inboard location, it being understood that if the wing 24 were swept in the opposite direction, the device 46 would be on the outboard side of the nacelle 12.)

As illustrated in FIGS. 4 and 5, the device 46 is positioned moderately rearwardly of the inlet lip 20 at a location outside of, but adjacent to, the inboard edge portion 42 of the wake 40 (shown in FIGS. 2 and 3) as it is passing from the upper lip portion 38. The effect of this is that the path and the development of the wake 40 is altered to that shown in FIGS. 4 and 5. The nacelle wake control device 46 sheds a strong vortex, indicated at 48, which passes over the leading edge of the wing in a manner to prevent the separated wake 40 from spreading over the inboard wing as well as drawing the outboard edge of the wake inwardly towards the vortex. This significantly reduces the span of the wake 40. By reducing the span of the wake 40, the separation on the wing 24 due to the nacelle wake/wing boundary layer interaction is reduced. The reduced separation results in increased lift at a given angle of attack and a delayed stall.

As a general guide to configuring the wake control device 46 for maximum lift, it must be so located so as to "capture" the inlet lip separation wake and to position the trailing vortex to clear the wing leading edge 26. The plan form and orientation of the wake control device 46 are chosen for strength and position of the trailing vortex.

One preferred configuration of the wake control device 46 is shown in FIGS. 7–10. The device 46 has an inside edge 50 which is contoured to fit against the nacelle surface 18 where device 46 attaches. There is a leading edge 52 which slants from the nacelle surface rearwardly in a radially outward direction from the centerline of the nacelle. There is an outer edge 54 spaced radially outwardly from the nacelle outer surface 18. The device 46 has a forward portion 56 having a greater height dimension and a rear portion 58 having a smaller height dimension. The overall thickness of the device 46 is made as small as is practical to reduce aerodynamic drag in cruise. However, the thickness dimension must be large enough to give it adequate structural strength. The alignment of the device 46 is selected to minimize drag for cruise and takeoff configurations and is generally aligned with the streamlines during the cruise and takeoff operating modes.

In operation, the forward portion 56 has the primary role of generating the vortex 48. The rear portion 58 is lightly loaded and contributes only secondarily to the vortex strength. However, it serves to direct part of the nacelle boundary layer away from the wing leading edge and nacelle pylon structure and energize other parts of the nacelle boundary layer, thus avoiding its detrimental effect on the wing upper surface flow. Thus, the forward portion 56 is desirably of a greater height than the rear portion 58. As shown herein, there is an abrupt change of height at a transverse edge 60. However, it is possible that the contouring of this edge 60 could be modified.

With regard to the positioning and sizing of the wake control device 46, this will obviously vary in accordance with the specific configuration and arrangement of the nacelle/wing assembly 10. In practice, for a given nacelle/wing assembly 10, the aerodynamicist would first ascertain the location of the inboard edge portion 42 of the wake 40. While this can, to some extent, be ascertained analytically in certain situations, it would be expected that this would commonly be ascertained by testing a given assembly 10 in a wind tunnel, using conventional techniques to ascertain flow patterns over the nacelle 12 and wing 24. This testing will enable the aerodynamicist to locate the wake control device 46 downwardly from the upper crown of the nacelle 12 on the inboard side of the surface 18 so as to be adjacent to but outside the wake inner edge portion 42. With this being accomplished, the aerodynamicist is then able to vary the length and height dimensions of the device 46 to optimize the performance for any given nacelle/wing assembly 10.

To illustrate how this might be accomplished in a preferred configuration, with a nacelle/wing assembly 10 such as shown in FIGS. 7 and 8, let it be assumed that the length of the nacelle (indicated at "a" in FIG. 7) is approximately 165 inches; the maximum diameter (indicated at "b" in FIG. 7) is about 90 inches; the flat portion of the nacelle crownline indicated at 62 is (indicated at "c" in FIG. 7) is about 17 inches below the leading edge 26 of the wing 24; and the upper lip portion 38 is (as indicated at "d" in FIG. 7) is about 148 inches forwardly of the leading edge 26. With such a configuration, nacelle flow pattern in the wind tunnel showed that the inboard edge portion 42 of the wake 40 is located at approximately fifty degrees (indicated at "e" in FIG. 8) downwardly from the crown, indicated at 62 in FIG. 8.

With such a nacelle/wing assembly configuration, a reasonably satisfactory placement of the device 46 would be fifty three degrees (indicated at "f" in FIG. 8, which is the most forward portion of the device 46) downwardly from the crown 62 of the nacelle 12. The foremost point of the leading edge 52 would be approximately 12.6 inches (indicated at "g" in FIG. 7) rearwardly of the inlet lip 20. The length of the forward portion 56 would be about 34 inches (see FIG. 10), while the length of the rear portion 58 would be about 50 inches. The maximum height dimension (indicated at "$h_F$") would be about 13 inches, while the height dimension of the rear portion 58 would be about 7 inches. The lengthwise axis of the wake control device 46 slants in a rearward direction upwardly at about a five degree angle (see FIG. 9).

The particular configuration described above was selected for a certain nacelle configuration where there is a forward inlet 70 and a middle fan cowl door 72 which is a composite structure which desirably should be loaded less lightly. It was found that by making the forward portion 56 with greater height, so as to contribute more to the formation of the vortex, and the rear portion 58 of lesser height, substantially the same benefit in alleviating the adverse effect of the wake could be achieved. The rear portion 58 was loaded to a lesser extent, but was still able to function in a manner to control boundary layer air which flows upwardly along the nacelle side surface. It should be emphasized that while the forward portion 56 is intended primarily to initially generate the vortex, and the rear portion 58 is designed to control the upward flow of boundary layer air, the two functions of these components 56 and 58 cannot be separated totally. In other words, the rear fence portion 58 will also have the effect of strengthening the vortex as well as properly positioning the vortex relative to the wake as it flows over the wing leading edge.

It was indicated earlier that the present invention is particularly useful where the turbulent wake off the upper inlet lip is especially damaging in destroying lift in the high angle of attack/high lift mode of operation. While this can be determined experimentally, to indicate generally where this might occur, reference is made to FIGS. 11 and 12. The general formula for finding where nacelle wake could be a problem is:

$$\pi = \left( \frac{Z_{min}/c}{D/b/2} \right) \tan \phi$$

where the following exists:
  D is the maximum diameter of the nacelle;
  c equals cord length of the wing at the location of the nacelle;
  b/2 is the span of the wing divided by two;
  x is the distance from the leading edge of the wing to the front lip of the nacelle;
  $Z_c$ is the distance from the centerline of the wing at the leading edge to the centerline of the nacelle;
  Z min is $Z_c - D/2$
  TAN $\phi = Z_{min}/x$ In the formula given above, where $\pi$ is low, nacelle wake is more likely to be a problem.

To arrive at a preferred configuration for the particular configuration of the nacelle shown in FIGS. 7 and 8, a number of wake control devices were tested in a wind tunnel. The specific arrangement and configuration of these devices is shown in the drawing. The length dimension is indicated as "L". The height dimension is indicated at "H". The distance of the leading edge of the foremost device rearwardly of the front lip is indicated at "d". The angular position of the device relative to the nacelle crownline is indicated on the drawing. Where there are several separate portions at different angular locations, the smallest and greatest angular configuration is given.

Figure 13:
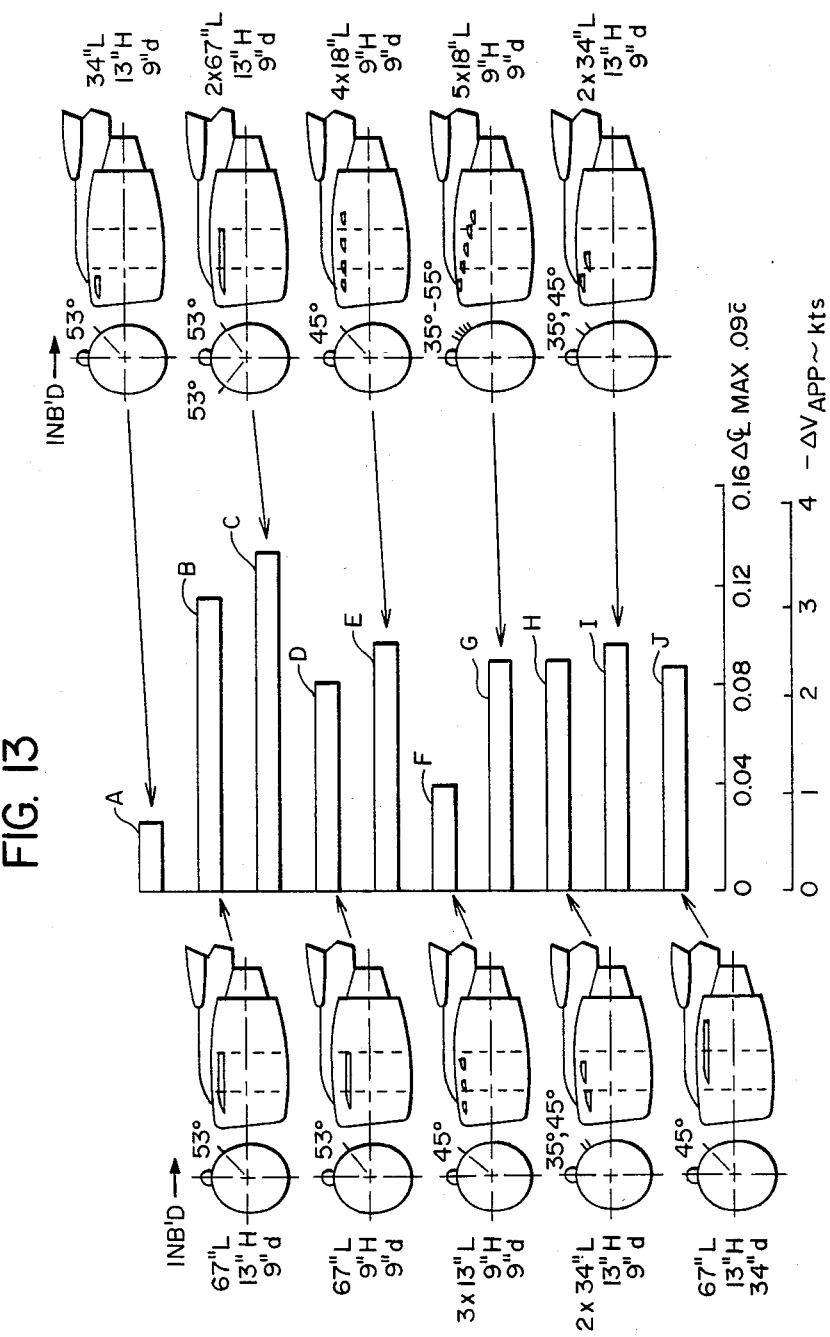
FIG. 13 is a semi-schematic showing of miscellaneous devices, and further illustrating in a bar graph performance of the same.

In the middle of the drawing of FIG. 13, there is a bar graph illustrating the increase in maximum lift coefficient. Also, for this particular configuration, there is given the amount of decrease in approach velocity (measured in knots) which could be achieved by these various wake control arrangements. It is to be understood that maximum lift coefficient is not the only factor to be considered, and one design may be preferred over another because of its effect on cruise drag, structural strength, or possibly some other considerations. Accordingly, some alternate configurations are presented for consideration.

The first configuration presented in FIG. 13, indicated at "A", represents a single vortex generating device such as one of the two described in the aforementioned U.S. Pat. No. 3,744,745. It can be seen that this had a relatively small effect in improving the lift coefficient. In other testing, two such devices, as indicated at "A", one on each side of the nacelle, were employed. This arrangement was closely representative of the arrangement of the two lift vanes shown in the aforementioned U.S. Pat. No. 3,744,745. It was found that single vortex control device, as shown at "A", produced the same increase in lift coefficient as the two vortex generators as shown in U.S. Pat. No. 3,744,745.

FIGS. 14 and 15 are given simply to show potentially broader aspects of the present invention, and are intended primarily to show that the forward portion of the wake control device to generate the vortex initially could possibly be made as several distinct members spaced at different angular locations upwardly along the side of the nacelle. The geometric parameters to be varied in a development test program of the nacelle wake control device are identified in FIGS. 14, 15 and 16.

It is to be understood that other modifications could be made without departing from the basic teachings of the present invention.

We claim:

1. In a nacelle and wing combination, where said wing is swept and has a leading edge, a trailing edge, an upper surface and a lower surface, said nacelle being mounted below and forwardly of the leading edge of the wing, said nacelle having an outside surface and having a forward portion extending forwardly of said wing leading edge and a forward inlet lip with an upper lip portion, the forward portion of the nacelle comprising a front third portion, a middle third portion, and a rear third portion, said wing having a first forward swept portion extending laterally and forwardly from said nacelle and a second rear swept portion extending laterally and rearwardly from said nacelle, said nacelle having first and second side portions adjacent said first and second wing portions, respectively, said wing and nacelle combination being characterized in that in a wing and nacelle alone configuration, with the wing in a high lift configuration and in a high lift/high angle of attack mode of operation, flow separates from said upper lip portion to form a highly turbulent wake which passes over the wing leading edge with said wake having first and second side edge portions at said first and second wing portions, respectively, said wake first side edge portion expanding laterally and rearwardly across said first forwardly swept wing portion so as to reduce lift, an improvement which is a wake control means located on said nacelle surface adjacent the first edge portion of the wake, said wake control means comprising a forward vortex generating portion extending outwardly from said nacelle surface and positioned rearwardly of said inlet lip of the nacelle, and a second fence portion positioned rearwardly of said vortex generating portion and extending lengthwise in said middle third portion of the nacelle, said forward vortex generating portion functioning primarily to initially generate a vortex which travels rearwardly and over said wing leading edge, and said fence portion controlling boundary layer air which flows upwardly and rearwardly along said nacelle first side surface portion so as to direct some of said boundary layer air away from said wing leading edge portion which is proximate to an upper part of said nacelle first side surface portion, and to energize other portions of said boundary layer air whereby said vortex becomes properly positioned adjacent the first side edge portion of the wake to limit expansion of the first side edge portion of the wake over the wing.

2. The improvement as recited in claim 1, wherein said wake control means has an elongate configuration having a lengthwise axis generally aligned with a lengthwise axis of said nacelle and aerodynamically contoured to limit drag for cruise mode of operation.

3. The improvement as recited in claim 2, wherein said vortex generating portion and said fence portion are aligned with one another and provide a substantially aerodynamically continuous wake control means.

4. The improvement as recited in claim 3, wherein said vortex generating portion has a height dimension from a center axis of said nacelle greater than a height dimension of the fence portion.

5. The improvement as recited in claim 2, wherein said vortex generating portion has a height dimension from a center axis of said nacelle greater than a height dimension of the fence portion.

6. The improvement as recited in claim 2, wherein said wake control means comprises a plurality of separate wake control members positioned at spaced lengthwise locations along said nacelle surface.

7. The improvement as recited in claim 2, wherein said vortex forming portion is located in said front third portion of the nacelle.

8. The improvement as recited in claim 7, wherein said nacelle has a cowl door located at said middle third portion, and said fence portion is mounted to said door, said vortex forming portion having a height greater than said fence portion.

9. In a nacelle and wing combination, where said wing is swept and has a leading edge, a trailing edge, an upper surface and a lower surface, said nacelle being mounted below and forwardly of the leading edge of the wing, said nacelle having an outside surface and having a forward portion extending forwardly of said wing leading edge and a forward inlet lip with an upper lip portion, the forward portion of the nacelle comprising a front third portion, a middle third portion, and a rear third portion, said wing having a first forward swept portion extending laterally and forwardly from said nacelle and a second rear swept portion extending laterally and rearwardly from said nacelle, said nacelle having first and second side portions adjacent said first and second wing portions, respectively, said wing and nacelle combination being characterized in that in a wing and nacelle alone configuration, with the wing in said high lift configuration and in a high lift/high angle of attack mode of operation, flow separates from said upper lip portion to form a highly turbulent wake which passes over the wing leading edge with said wake having first and second side edge portions at said first and second wing portions, respectively, said wake first side edge portion expanding laterally and rearwardly across said first forwardly swept wing portion so as to reduce lift, a method of controlling said wake by forming a vortex on said nacelle surface adjacent the first edge portion of the wake at a forward location rearward of said lip to cause said vortex to travel rearwardly over said wing leading edge, and providing a fence rearwardly of the vortex generating location with said fence extending lengthwise in said middle third portion of the nacelle, said fence controlling boundary layer air which flows upwardly and rearwardly along said nacelle first side surface portion so as to direct some of said boundary layer air away from said wing leading edge portion which is proximate to an upper part of said nacelle first side surface portion, and to energize other portions of said boundary layer air, whereby said vortex becomes properly positioned adjacent the first side edge portion of the wake to limit expansion of the first side edge portion of the wake over the wing.

10. The method as recited in claim 9, wherein said vortex is generated by wake control means having an elongate configuration having a lengthwise axis generally aligned with a lengthwise axis of said nacelle and aerodynamically contoured to limit drag for cruise mode of operation.

11. The method as recited in claim 9, wherein said vortex is generated by vortex generating portion which is aligned with said fence to provide a substantially aerodynamically continuous wake control means.

12. The method as recited in claim 11, wherein said vortex generating portion has a height dimension from a center axis of said nacelle greater than a height dimension of the fence portion.

13. A method of designing and building a nacelle and wing combination, where said wing is swept and has a leading edge, a trailing edge, an upper surface and a lower surface, said nacelle being mounted below and forwardly of the leading edge of the wing, said nacelle having an outside surface and having a forward portion extending forwardly of said wing leading edge and a forward inlet lip with an upper lip portion, the forward portion of the nacelle comprising a front third portion, a middle third portion, and a rear third portion, said wing having a first forward swept portion extending laterally and forwardly from said nacelle and a second rear swept portion extending laterally and rearwardly from said nacelle, said nacelle having first and second side portions adjacent said first and second wing portions, respectively, (a) determining whether a turbulent wake condition exists, when, with said wing and nacelle combination in a wing and nacelle alone configuration, with the wing in a high lift configuration and in a high lift/high angle of attack mode of operation, flow separates from said upper lip portion to form said highly turbulent wake which passes over the wing leading edge with said wake having first and second side edge portions at said first and second wing portions, respectively, and said wake first side edge portion expands laterally and rearwardly across said forwardly swept wing portion so as to reduce lift, (b) determining location of said first side edge portion of the wake as the wake leaves the upper lip portion at a forward part of said nacelle, (c) mounting a vortex generating means to the nacelle rearwardly of said lip and adjacent to said first side edge portion at a location to generate a vortex which travels rearwardly over the leading edge of the wing, (d) mounting a fence rearwardly of the vortex generating portion in the middle third portion of the nacelle side surface rearwardly of said vortex generating portion at a location to control boundary layer flow rearwardly and upwardly along the first side portion of the nacelle so as to position said vortex properly adjacent the first side edge portion of the wake and limit expansion of the first side edge portion of the wake over the wing.

14. The method as recited in claim 13, further comprising placing said vortex generating means and said fence in alignment with one another in a manner to provide a substantially aerodynamically continuous wake control means.

15. The method as recited in claim 14, wherein said vortex generating means is formed with a height dimension from a center axis of said nacelle greater than a height dimension of the fence.

16. The method as recited in claim 13, wherein said vortex generating means is formed with a height dimension from a center axis of said nacelle greater than a height dimension of the fence.

17. The method as recited in claim 13, further comprising forming said vortex generating means and said fence as a plurality of separate wake control members positioned at spaced lengthwise locations along said nacelle surface.

18. The method as recited in claim 13, wherein said vortex forming portion is located in said front third portion of the nacelle.

19. The method as recited in claim 18, wherein said nacelle has a cowl door located at said middle third portion, and said fence is mounted to said door, said vortex generating means having a height greater than said fence.

* * * * *